Jan. 23, 1940.     O. F. MARVIN     2,187,750
TREATMENT OF ORES
Filed July 31, 1936     2 Sheets-Sheet 1

Jan. 23, 1940.    O. F. MARVIN    2,187,750
TREATMENT OF ORES
Filed July 31, 1936    2 Sheets-Sheet 2

INVENTOR.
Orrin F. Marvin,
BY
ATTORNEYS

Patented Jan. 23, 1940

2,187,750

UNITED STATES PATENT OFFICE 2,187,750

TREATMENT OF ORES

Orrin F. Marvin, Los Angeles, Calif., assignor to Marvin Metals, Inc., Los Angeles, Calif., a corporation of California Application July 31, 1936, Serial No. 93,650

17 Claims. (Cl. 75—101)

This invention relates to the recovery of metals or other elements from ores containing the same. The invention is particularly useful in the treatment of ores containing one or more non-oxidized minerals or compounds, but may also be used for the treatment of other ores. The term "ore" as used herein will be understood to include either a naturally occurring ore or a mineral concentrate or any other mineral product containing two or more different metals or other elements, either with or without the presence of a varying percentage of silicious or other gangue material.

This application is a continuation-in-part of my copending application Serial No. 28,384, filed June 25, 1935.

In general, the process described herein is applicable to many different types of ores containing two or more metallic or other elements, for the purpose of separating such elements and separately recovering one or more of the separated elements, either in combined or elemental form.

The process is particularly useful for the separation and recovery of elements which are combined with one another in the original ore, one element (a metal) being present as a basic radical and the other element (either a metal or nonmetal) being present as an acidic radical. Examples of such ores are those containing one or more compounds of a metallic element such as lead, zinc, copper, nickel, cobalt, cadmium, mercury, iron, manganese, tin, bismuth, antimony, arsenic, or molybdenum, with another element present in an acidic radical such as sulphide, sulphate, arsenide, arsenate, molybdate, vanadate, tungstate, chromate, phosphate, selenide, telluride, chloride, or other halide. A particular object of the invention, as applied to such ores, is to separate elements which were combined with one another in the original ore, thus making it possible to separately recover one or both of such elements, either in elemental or combined form.

A further object of the invention is to provide for the treatment of an ore containing two or more such compounds, for the purpose of separating two or more different elements present therein, and separately recovering one or more of said elements, either in elemental or combined form.

A further object of the invention is to provide for the separation and recovery of a plurality of metals from ores in which one or more of such metals may be originally present in combination with an acidic radical or as an oxide, and one or more of the elements may be present in free state.

A further object of the invention is to provide for the separation of a plurality of metals or other elements present in an ore, and for the separate recovery of one or more of such elements, and the invention is particularly applicable to complex ores in which a considerable number of elements are present and which cannot be readily treated for the separation of such elements by previously known methods.

A particular object of this invention is to provide an advantageous process for treating ores containing gold, silver, or platinum, either in free or combined form, and also containing one or more other elements whose presence interferes with or prevents the economical recovery of such gold, silver, or platinum by ordinary methods, for the purpose of separating such one or more other elements from the gold, silver, or platinum and making it possible to economically recover such gold, silver or platinum.

Other objects and advantages of this invention will be referred to hereinafter or will be apparent from the following description.

An essential feature of the present invention consists in heating an ore with a carbonate or oxide of an alkali metal, under suitable conditions, to cause reaction of said alkali metal carbonate or oxide with one or more compounds present in the ore, resulting in the formation of products containing different ones or groups of the elements to be separated, which products differ from one another in respect to their solubility in water, acid, or other liquid solvent, or in respect to their susceptibility to separation by other known means. The resulting mixture is then treated to separate such products, as by separately dissolving one or more of such products in a suitable liquid solvent or a plurality of different liquid solvents and treating one or more of the resulting solutions to separately recover a desired element or elements present therein, and, if desired, subjecting the undissolved residue to further treatment for the recovery of other elements present therein.

In general, the reaction with an alkali metal carbonate or oxide causes certain elements, if present in the ore, to be converted to water-soluble alkali metal salts, and other elements to be converted to compounds difficultly soluble in water but soluble in some other solvent. For example, certain elements will be converted to compounds which are difficultly soluble in water but are soluble in an aqueous solution of acetic acid or other organic acid, while other elements will be converted to compounds difficultly soluble both in water and organic acid solutions but soluble in a strong mineral acid, and still other elements such as gold, platinum, or silver, are left in free or elemental state and are substantially insoluble in any of the above solvents, but may be recovered by known methods such as the well-known cyanide process, or by smelting.

The metals or elements which tend, upon heating with an alkali metal carbonate or oxide as above described, to form water-soluble salts with such alkali metal, include principally sulphur, selenium, arsenic, phosphorus, molybdenum, vanadium, tungsten, chromium, tellurium, and the halogens. Tin present as sulphide, or in the presence of free sulphur, may also under certain conditions react to form a water-soluble alkali metal salt.

I have found that, if an ore containing a compound of lead, zinc, copper, or cadmium, with an acidic radical containing an element of the last above-mentioned group, is caused to react with an alkali metal carbonate or oxide by heating under suitable conditions, the acidic radical may be converted to a water-soluble salt of the alkali metal containing the element originally present in said acidic radical, and the metal may be converted to an oxide or other compound thereof, which is difficultly soluble in water but is more or less readily soluble in an aqueous solution of acetic acid or other suitable organic acid.

Other elements such as nickel, cobalt, iron, and manganese, originally present in combination with an acidic radical in the ore will be converted by the above-described treatment into oxides which are difficultly soluble in both water and acetic acid or other comparable organic acid. Of these, the oxides of nickel and cobalt are readily soluble in strong mineral acids.

Mercury present in the ore, either free or combined, for example, as sulphide, will be volatilized substantially completely in elemental form during the above-described treatment.

Gold, silver, and platinum, if present in either free or combined state in the ore, are present in elemental state following the heating with alkali metal carbonate.

Certain elements, such as antimony and bismuth, which form amphoteric oxides capable of reacting with an alkali metal carbonate or oxide upon heating therewith, to form alkali metal compounds in which such element is present in an acidic radical may be present in the material following the heat treatment, either in the form of an oxide of such element or in the form of an alkali metal compound thereof, or both, depending largely upon the proportion of alkali metal carbonate or oxide present during the heating operation. However, upon leaching the mass with water following the above reaction, any alkali metal compound of bismuth so formed will ordinarily hydrolize, resulting in formation of a water-insoluble oxide, while any such antimony compound will either hydrolize to form a water-insoluble oxide or will remain as a substantially water-insoluble alkali metal compound.

The accompanying drawings illustrate the method described herein, and referring thereto:

Figure 1:
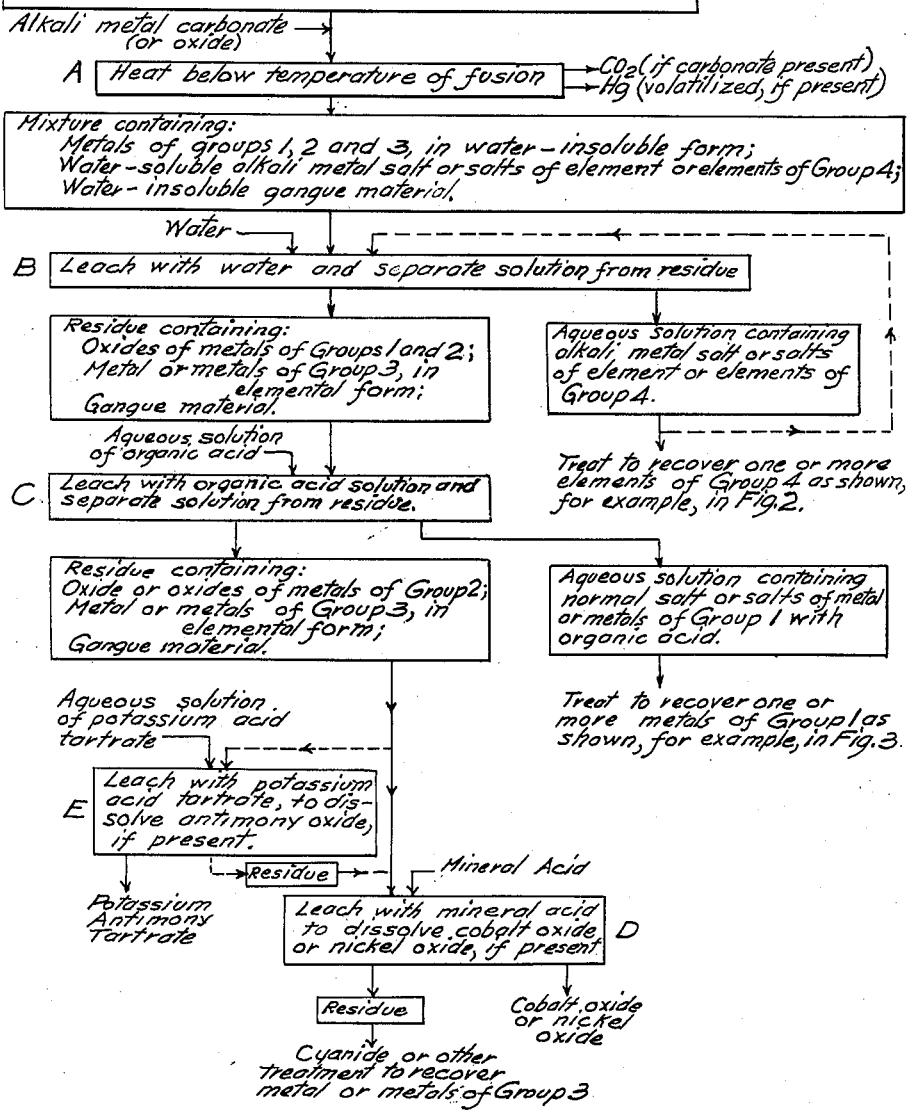
Fig. 1 is a flow sheet of the process as a whole.

In Fig. 1, the process is shown as applied to the treatment of an ore containing one or more metals of the group consisting of lead, zinc, copper, cadmium, and bismuth (designated as group 1), one or more metals of the group consisting of nickel, cobalt, iron, manganese, and antimony (designated as group 2), one or more metals of the group consisting of gold, silver, and platinum (designated as group 3), and one or more elements of the group consisting of sulphur, selenium, arsenic, phosphorus, molybdenum, vanadium, tungsten, chromium, tellurium and the halogens (designated as group 4), together with gangue material, and either with or without one or more other metals such as mercury.

According to the process of this invention, the ore is preferably first ground or comminuted to a suitable state of division, for example, about 40 mesh or finer, and is thoroughly mixed, either during or after grinding, with an alkali metal carbonate or oxide, such as ordinary commercial soda ash, in an amount preferably slightly in excess over that required to combine with each constituent element of the ore which it is desired to recover in combination with the alkali metal as a water-soluble compound of an acidic radical containing said element.

The mixture is then introduced into a reaction chamber, and heated until the reaction begins, a temperature of about 400° C. or less ordinarily being sufficient for this purpose. If the ore contains a considerable quantity of non-oxidized ores, and if an oxidizing atmosphere is maintained, the reaction is exothermic, and in such cases the heat of the reaction is generally sufficient to keep the entire mass heated to a temperature sufficient to maintain the reaction. The temperature should be maintained below the temperature of fusion, and preferably below 800° C., until the reaction is completed. The mixture is preferably actively agitated during the reaction period. This heating step is indicated at A in Fig. 1.

In some cases, it may be necessary or advantageous to apply some additional heat after reaction has commenced, and particularly after the reaction or reactions are nearly completed, but care should be exercised not to heat the mass to a sufficient temperature to cause appreciable fusion of the whole or of any important constituent thereof during the progress of the reaction. By avoiding such fusion until the desired reaction or reactions are completed, such reactions may be substantially completely effected in a very short time, with a minimum consumption of heat, and without causing any undesired reactions to take place. In particular, I have found that by avoiding fusion during the reaction, substantially complete reaction of the alkali metal compound may be obtained, resulting in conversion of the metals or other elements present to the desired oxides or other compounds or to free state, without causing any appreciable combination of the alkali metal with silica present, and the silica will be substantially wholly present in water-insoluble form in the mass following treatment, either as $SiO_2$ or in its original state of combination as a silicate. This not only represents a saving in the amount of alkali metal compound required, but also causes the silica to appear in a form which does not interfere with the subsequent separation and recovery of the desired constituents.

A further reason for avoiding fusion during the reaction is that certain metals, such as copper, lead, bismuth, or cadmium, which it is desired to obtain as oxides following the heating operation, would be more or less completely reduced to metallic state if fusion were allowed to occur before the desired reaction or reactions are completed, and would thus be difficult to recover. Fusion would also, in certain cases, cause some of the metals, or the oxides thereof, to react to form other undesired compounds.

In case the ore contains one or more constituents of low melting point, such as arsenic compounds or halides, which would tend to fuse if the ore was quickly heated to a high temperature but which are capable of reacting with the alkali metal carbonate or oxide at temperatures below the temperature of fusion, to form products of higher melting point, I prefer to first heat the mass to a relatively low temperature, such as about 300° to 400° C. and maintain such low temperature until said constituent or constituents have been largely or substantially wholly converted by such reaction or reactions, and to then gradually raise the temperature, if necessary, to cause other constituents to react.

The heating operation may be carried out in a rotary kiln, a multiple hearth furnace, or any other suitable type of furnace, preferably provided with means for agitating the mass during this operation. If an oxidizing atmosphere is desired, as in case the ore contains non-oxidized minerals such as sulphides, arsenides or the like, and it is desired to recover the water-soluble alkali metal salt reaction products in oxidized form, such as sulphates, arsenates or the like, air or other oxidizing gas may be passed through or introduced into the reaction chamber in such manner as to provide intimate contact thereof with the reacting materials, during the heating operation. On the other hand, if a non-oxidizing atmosphere is desired, as in case it is desired to recover such products in non-oxidized form, such as alkali metal sulphides or arsenides, I may substantially exclude or restrict the admission of air to the reaction chamber, or may introduce an inert gas or a reducing gas thereto.

In some cases, it may be desirable to heat the mass to a somewhat higher temperature than indicated above, to cause partial or complete fusion thereof, after the reaction or reactions are substantially completed, but this is generally unnecessary and may in some cases be detrimental to the success of the process.

The time required for this roasting or heating operation varies considerably, depending upon the particular ore being treated, the temperature schedule maintained, the rate of supply of oxygen to the furnace, the rate of mixing, and the type of furnace employed. In most cases, however, when carried out under proper conditions on a commercial scale, it is found that the reaction may be completed in from three minutes to about one hour, and in most cases from about five to thirty minutes.

The following may be given as illustrative examples of probable reactions effected by subjecting ores containing certain mineral compounds to treatment as above described, in the presence of an oxidizing atmosphere:

(1) $MS + Na_2CO_3 + 2O_2 = MO + Na_2SO_4 + CO_2$, where M represents a bivalent readily oxidized metal such as lead, zinc, copper, nickel, or cadmium, in the minerals galena, sphalerite, covellite, millerite ($Ni_2S_2$), or greenockite;

(2) $2Cu_2S$(chalcocite) $+ 2Na_2CO_3 + 5O_2 =$
$4CuO + 2Na_2SO_4 + 2CO_2$;

(3) $Bi_2S_3$(bismuthinite) $+ 3Na_2CO_3 + 6O_2 =$
$Bi_2O_3 + 3Na_2SO_4 + 3CO_2$,
in which Bi may be replaced by Sb, in stibnite;*

(4) $Co_3S_4$(linnaeite) $+ 4Na_2CO_3 + 8O_2 =$
$Co_3O_4 + 4Na_2SO_4 + 4CO_2$;

(5) $4CuFeS_2$(chalcopyrite) $+ 8Na_2CO_3 + 17O_2 =$
$4CuO + 2Fe_2O_3 + 8Na_2SO_4 + 8CO_2$;

(6) $As_2S_3$(realgar) $+ 6Na_2CO_3 + 7O_2 =$
$2Na_3AsO_4 + 3Na_2SO_4 + 6CO_2$;

(7) $2Ag_2S$(argentite) $+ 2Na_2CO_3 + 3O_2 =$
$4Ag + 2Na_2SO_4 + 2CO_2$;

(8) $8HgS$(cinnabar) $+ 2Na_2CO_3 + 3O_2 =$
$2Hg + 2Na_2SO_4 + 2CO_2$;

(9) $4FeS_2$(pyrite) $+ 8Na_2CO_3 + 15O_2 =$
$2Fe_2O_3 + 8Na_2SO_4 + 8CO_2$;

*Under certain conditions, Bi or Sb may be converted to alkali metal salts thereof, but such salts will hydrolize upon leaching with water, to form the oxides.

(10) $PbS.SnS$(teallite) $+ 2Na_2CO_3 + 5O_2 =$
$PbO + Na_2SnO_3 + 2Na_2SO_4 + 2CO_2$;**

(11) $2MoS_2$(molybdenite) $+ 6Na_2CO_3 + 9O_2 =$
$2Na_2MoO_4 + 4Na_2SO_4 + 6CO_2$

**Unless a relatively large proportion of free sulphur is present, Sn may be partly converted to a substantially insoluble oxide.

Reactions comparable to some of the above, or other reactions, may occur with compounds containing other acidic radicals instead of or in combination with the sulphide of the above examples. As illustrations of probable reactions which may so occur, the following may be noted:

(12) $4CoAs_3$(skutterudite) $+ 18Na_2CO_3 + 17O_2 =$
$4CoO + 12Na_3AsO_4 + 18CO_2$;

(13) $4CoAsS$(cobaltite) $+ 10Na_2CO_3 + 13O_2 =$
$4CoO + 4Na_2SO_4 + 4Na_3AsO_4 + 10CO_2$,
in which Co may be replaced by Ni, in gersdorffite;

(14) $4Ag_3AsS_3$(proustite) $+ 18Na_2CO_3 + 23O_2 =$
$12Ag + 12Na_2SO_4 + 4Na_3AsO_4 + 18CO_2$;

(15) $NiAs_2$(chloanthite) $+ 3Na_2CO_3 + 3O_2 =$
$NiO + 2Na_3AsO_4 + 3CO_2$;

(16) $Pb_5(AsO_4)_3Cl$(mimetite) $+ 5Na_2CO_3 =$
$5PbO + 3Na_3AsO_4 + NaCl + 5CO_2$;

(17) $Pb_5(PO_4)_3Cl$(pyromorphite) $+ 5Na_2CO_3 =$
$5PbO + 3Na_3PO_4 + NaCl + 5CO_2$;

(18) $Pb_5(VO_4)_3Cl$(vanadinite) $+ 5Na_2CO_3 =$
$5PbO + 3Na_3VO_4 + NaCl + 5CO_2$;

(19) $PbSO_4$(anglesite) $+ Na_2CO_3 = PbO + Na_2SO_4 + CO_2$;

(20) $PbCrO_4$(crocoite) $+ Na_2CO_3 = PbO + Na_2CrO_4 + CO_2$;

(21) $PbMoO_4$(wulfenite) $+ Na_2CO_3 =$
$PbO + Na_2MoO_4 + CO_2$;

(22) $PbWO_4$(stolzite) $+ Na_2CO_3 = PbO + Na_2WO_4 + CO_2$;

(23) $PbSe$(clausthalite) $+ Na_2CO_3 + 2O_2 =$
$PbO + Na_2SeO_4 + CO_2$;

(24) $PdTe$(altaite) $+ Na_2CO_3 + 2O_2 =$
$PbO + Na_2TeO_4 + CO_2$;

(25) $4AgCl$(hornsilver) $+ 2Na_2CO_3 =$
$4Ag + 4NaCl + O_2 + 2CO_2$;

(26) $4AgBr$(bromide) $+ 2Na_2CO_3 + 5O_2 =$
$4Ag + 4NaBrO_3 + 2CO_2$;

(27) $2Ag_2Te$(telluride) $+ 2Na_2CO_3 + 3O_2 =$
$4Ag + 2Na_2TeO_4 + 2CO_2$;

(28) $2(Au.Ag)_2Te_3$(sylvanite) $+ 6Na_2CO_3 + 9O_2 =$
$4Au + 4Ag + 6Na_2TeO_4 + 6CO_2$;

(29) $2HgSe$(tiemannite) $+ 2Na_2CO_3 + 3O_2 =$
$2Hg + 2Na_2SeO_4 + 2CO_2$

Reactions comparable to some of the above may also be carried out in a non-oxidizing atmosphere, resulting in the conversion of the metals to oxides or to the free state, and in the formation of water-soluble alkali metal compounds.

It will be noted that each of the above reactions results in the formation of one or more water-soluble alkali metal salts, in which the alkali metal is combined with an acidic radical comprising an element originally present in the ore. In those cases where the original constituent compound of the ore contains lead, zinc, copper, nickel, cadmium, cobalt, iron, the reaction also results in the production of an oxide of such metal. Tin, bismuth, and antimony may react differently under different conditions, as has been explained above. Where silver or gold is present in either free or combined state in the original ore, such metal is present in free or elemental condition in the mass following the reaction.

Any mercury produced by Equation 8 from cinnabar originally present in the ore will be distilled off at the temperature employed in the above operation, and may be recovered by condensation from the gases leaving the reaction chamber. Due to the fact that such elements as sulphur, selenium and arsenic, which sometimes occur in mercury ores, are converted in the roasting operation to non-volatile alkali metal compounds, the mercury is condensed in the substantial absence of these elements or compounds thereof, thus making it possible to directly recover the mercury substantially free from impurities containing these elements. This is an advantage as compared with ordinary methods of subliming mercury from such ores, in which the sulphur, selenium, arsenic or other elements of analogous behavior are largely volatilized as oxides and are condensed along with the mercury.

The carbon dioxide gas formed by the above reactions is allowed to continually escape from the reaction chamber.

In case the ore contains oxides or carbonates of certain metals, such metals will generally be present as oxides following the above-described heating operation. Examples of such oxides and carbonates are as follows:

$PbCO_3$—cerussite
$PbO.2PbCl_2$—penfieldite
$Cu_2O$—cuprite
$Cu_2(OH)_2CO_3$—malachite
$ZnO$—zincite
$ZnCO_3$—smithsonite
$MnO_2$—pyrolusite
$SnO_2$—cassiterite Following the above heating or roasting operation, the mass including the solid reaction products is leached with water in sufficient amount to dissolve the water-soluble alkali metal salts formed during such operation. This leaching operation is preferably conducted by digesting the mass with hot water, while in divided condition. If the heating is conducted without fusion, the products will be in a granular or finely divided condition and will ordinarily require no further grinding or only a light grinding or disintegrating action at this stage, but if partial or complete fusion has taken place, the mass may be ground or otherwise reduced to a proper state of division for satisfactory leaching. The resulting solution may be separated from the undissolved material, including water-insoluble reaction products together with any insoluble gangue or other associated material, as by filtration, decantation, de-watering or centrifuging. The above leaching and separating operations are indicated at B in Fig. 1. The solution thus obtained may contain one or more soluble salts of one or more of the elements of the above-mentioned group 4, formed by one or more of the above-described reactions or by other comparable reactions, dependent upon the materials present in the original ore and upon the conditions of treatment. Such solution may, for example, contain soluble alkali metal compounds formed by reaction with compounds present in the ore which contain any of the following elements, and in case the reaction is conducted in an oxidizing atmosphere or the acidic radicals were originally in an oxidized state, such soluble compounds may be present in the form of the below-listed compounds of the alkali metal employed:

S—sulphate          P—phosphate
As—arsenate         Cr—chromate
Se—selenate         Cl—chloride
Te—tellurate        Br—bromate
Va—vanadate         F—fluoride
Mo—molybdate        Sn—stannate
W—tungstate This solution may be treated in any desired manner to recover therefrom one or more of the elements whose soluble salts are contained therein. If one or more of these salts is present in high concentration, the solution may simply be concentrated by evaporation if desired, and then cooled to cause such salt or salts to crystallize therefrom. In general, however, I prefer to return the aqueous solution for use in dissolving further quantities of soluble salt or salts from other batches of treated material in step B, as indicated in dotted lines in Fig. 1, until the concentration of soluble salts therein is built up to the point where the solution becomes substantially saturated with one or more of these salts. If more than one soluble alkali metal compound is present in sufficient quantity to warrant recovery thereof, the solution may be treated by known methods, such as fractional crystallization, precipitation with suitable chemical reagents, or the like, to recover each of such constituents separately from the other.

Figure 2:
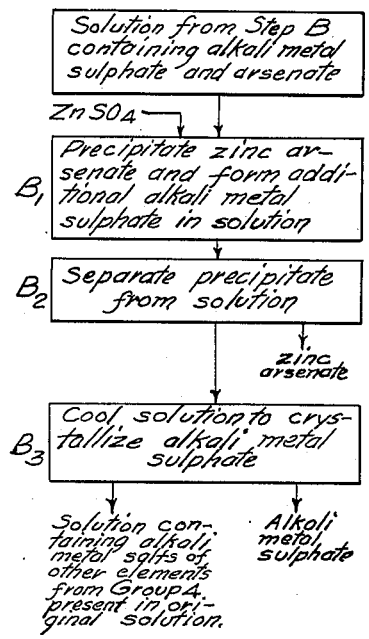
Figs. 2 and 3 are flow sheets illustrating specific embodiments of certain portions of the process.

In case the solution thus obtained contains a relatively large proportion of one or more alkali metal salts, such as the sulphate and/or arsenate, and also contains one or more other valuable alkali metal salts in relatively small proportion, such as the vanadate, molybdate, tungstate, bromate, tellurate, or selenate, the first-mentioned compound or compounds may be separated therefrom by crystallization, and the remaining solution may be re-utilized for leaching further quantities of treated ore, until the concentration of one or more of said other compounds becomes sufficiently high to permit such one or more other compound to be recovered, as by crystallization, precipitation by suitable chemical reagents, or in some other suitable manner. As a specific example, as illustrated in Fig. 2, in case the solution contains sulphate and arsenate and it is desired to separate these two salts, I may add a suitable amount of zinc sulphate, to precipitate zinc arsenate and form additional alkali metal sulphate in solution as indicated at $B_1$, and the precipitated zinc arsenate may be separated as at $B_2$, after which the alkali metal sulphate may be recovered by cooling the solution to cause crystallization thereof as at $B_3$.

The undissolved residue following the water leaching operation may contain one or more water-insoluble metal oxides of the above-mentioned groups 1 and 2, and one or more free metals of the above-mentioned group 3, which were either present as such in the original ore or were produced by the heat treatment with the alkali metal carbonate or oxide. In the case of treatment of most ores containing one or more of the metals, lead, zinc, copper, cadmium and bismuth, the material may advantageously be next leached with an aqueous solution of acetic acid or other equivalent organic acid to separate such metal or metals from other metals which are present in free state or in the form of oxides substantially insoluble in such organic acid. The acetic acid may be used in the form of an aqueous solution of any suitable concentration, for example, from about 5% to about 40%, good results being generally obtained by the use of a 20% solution. Also, I may use aqueous solutions of other organic acids which form water-soluble salts with the metal oxides present in the material, such as propionic trichloracetic, or butyric acid. I have found that the best results are obtained by the use of a weakly ionized organic acid, and acetic acid is generally to be preferred because of its relatively low cost and general commercial availability. This leaching operation may be carried out at atmospheric temperature, although temperatures somewhat above atmospheric may be advantageous in certain cases. The most advantageous temperature to be employed will depend upon the particular metal oxide or oxides which are to be dissolved. I have found, for example, that in the case of lead oxide or copper oxide, a temperature of about 80° to 100° C. is generally preferable. The oxides which, if present in the material, are readily dissolved by the aqueous acetic acid solution, include the oxides of the metals mentioned immediately above, namely, lead, zinc, copper, cadmium, and bismuth. The amount of acetic acid employed should be somewhat in excess of that required to react with substantially all of the above oxides present in the material, to form normal acetates of the metals thus dissolved, and the proportion of excess acid should be sufficient to prevent formation of any basic acetate compounds.

If iron oxide is present, a small amount thereof may in some cases also be dissolved as an acetate, but I have found that it is possible to substantially completely dissolve the other metal oxides above mentioned without dissolving an appreciable amount of iron oxide. I prefer in most cases to provide a sufficient degree of oxidation during the roasting or heating operation to convert the iron principally to $Fe_2O_3$, which is difficultly soluble in both organic acid and mineral acid solutions, thus effecting an economy in consumption of such acids used to dissolve other oxides.

The resulting solution, containing the dissolved acetates or other organic acid salts of one or more of the last above-mentioned group of metals, may be separated from remaining undissolved material in any suitable manner, as by filtration, centrifuging, or the like, preferably followed by washing. The above described step of leaching with organic acid and separating the solution from the undissolved residue is indicated at C in Fig. 1.

Figure 3:
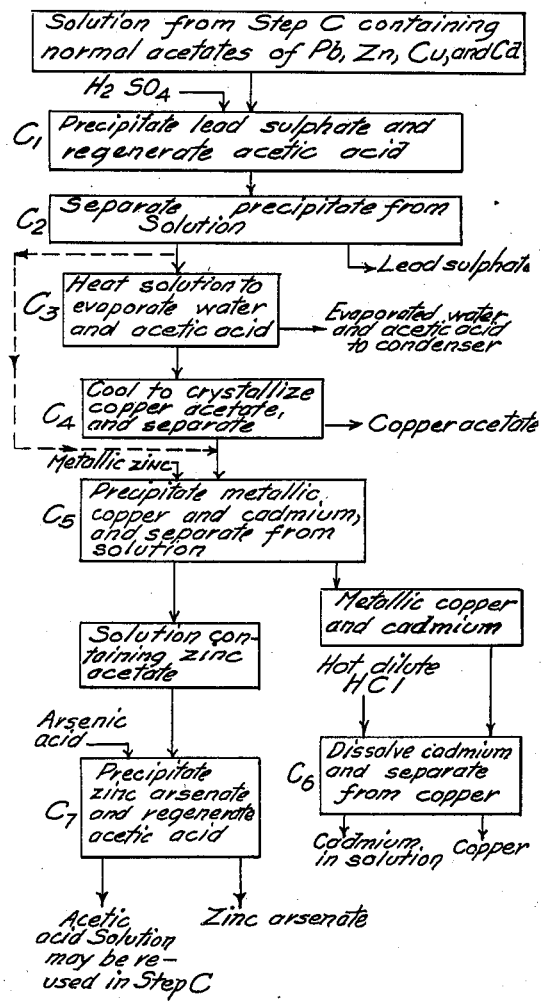

The resulting solution may, if desired, be then treated to recover therefrom one or more of the metal acetates or other organic acid salts dissolved therein. Instead of recovering the dissolved salts, however, I generally prefer to recover one or more of the desired metals from this solution by precipitation with a suitable chemical reagent or reagents. For example, if lead is present as the normal acetate, it may advantageously be precipitated by adding sulphuric acid, resulting in the precipitation of lead sulphate. Other known methods, such as crystallization by cooling, or precipitation by suitable chemical reagents, may be employed for the recovery of compounds of one or more other metals present in this solution. Certain procedures which may be employed for separately recovering one or more metals from this solution are more fully described hereinafter, and are illustrated in Fig. 3.

The remaining undissolved residue, or the residue from the water leaching step in case it is not desired to first subject the same to leaching with acetic acid or the like, may be further treated to dissolve or recover other compounds or elements present therein. Such residue may contain, for example, one or more metal oxides, such as oxides of nickel, cobalt, iron, manganese, tin, or antimony and/or one or more free metals such as gold, silver or platinum, and ordinarily will also contain undissolved gangue materials. For example, if oxides of cobalt or nickel are present, the material may be leached with a solution of hydrochloric, sulphuric, nitric, or other strong mineral acid, as indicated at D in Fig. 1. Cobalt oxide or nickel oxide will thus be dissolved, and the resulting solution may be separated from any remaining undissolved material in any desired manner, as by filtration or centrifuging, preferably followed by washing, and may be treated by known methods to recover the cobalt or nickel therefrom.

If antimony is present, it may be dissolved by leaching with an aqueous solution of potassium acid tartrate, which will dissolve the antimony as potassium antimony tartrate, as indicated at E in Fig. 1. If antimony is to be removed in this manner, this is preferably done directly after the leaching with acetic acid or other organic acid for removing the lead, zinc, copper, cadmium and bismuth, if present, and is preferably done before leaching with a strong mineral acid for removing cobalt and nickel, if present, as indicated by the dotted lines leading to and from step E in Fig. 1.

If the residue contains gold, platinum or silver in free state, such residue may be subjected to any desired treatment to recover such metal. For example, such free metal may be recovered by the well-known cyanide process, and a very economical and complete recovery may be so obtained, due to the fact that other elements such as lead, copper, arsenic, or sulphur, which may be present in the original ore and which are known to interfere seriously with the extraction of free gold, silver or platinum, have been previously removed from the ore. It may not be necessary, in all cases, to leach with either an organic acid, mineral acid, or other solvent, prior to the recovery of the gold, silver or platinum, but I prefer to first remove any metallic oxides whose presence would interfere with such recovery. For example, if lead or copper is present, the material is preferably leached with acetic acid prior to cyaniding.

As an illustrative example of the application of this invention to a mixture containing a large number of different elements, a synthetic "ore" was prepared containing appreciable proportions of the following compounds:

$Sb_2S_5$
$Bi_2S_3$, $Bi_2S_4Cu_2$
$CdS$
$CoAs_3$, $Co_3S_4$ and $Co_3(AsO_4)_2$
$Cu_2S$, $CuFeS_2$ and $(4Cu_2S.Sb_2S_3)$
$HgS$
$Ni_2S_3$ and $NiAsS$
$ZnS$
$MnO_2$
$FeS_2$ and $FeSAs$
$PbS$, $PbAs_2S_3$, $3Pb_3(PO_4)_2.PbCl_2$,
$3Pb_3(BO_4)_2.PbCl_2$, $PbWO_3$, $PbMoO_4$, $PbTe$, $PbSe$ and $PbCrO_4$
$Ag_2S$, $Ag_3AsS_3$, $AgCl$ and $AgBr$
$Au$, $(AuAg)_2Te_3$ and $(PbAu)_2(TeSSb)_3$ It will be seen that the above mixture contained the metallic elements antimony, bismuth, cadmium, cobalt, copper, mercury, nickel, zinc, manganese, iron, lead, silver and gold, and also contained a large number of elements capable of forming, by reaction with an alkali metal carbonate under the conditions above described, water-soluble alkali metal compounds in which the alkali metal is combined with an acidic radical containing such element. The elements of this latter type, present in the above mixture, include sulphur, arsenic, tellurium, chromium, molybdenum, tungsten, selenium, vanadium, phosphorous, and chlorine.

The above compounds were mixed together in finely divided condition, and sodium carbonate was added to the mixture in excess of the amount necessary to form alkali metal compounds with the elements of the last-mentioned group. The mixture was then heated in an enclosed chamber provided with means for continually passing air therethrough to maintain an oxidizing atmosphere, and also provided with means for continually agitating the material within the chamber. The temperature was first raised to approximately 300° C., and then gradually increased to approximately 750° C., the total time required for completion of the roasting operation being approximately 45 minutes. The mercury was converted to elemental form and was vaporized at a relatively low temperature of about 300° to 350° C., and the vaporized mercury was recovered as substantially pure metallic mercury by condensation from the gases leaving the heating chamber.

The mixture was then removed from the heating chamber, and was leached with hot water, to dissolve the water-soluble alkali metal compounds. The resulting solution was separated from the undissolved residue by filtration and the residue washed with hot water. The filtrate contained substantially all of the elements of the last group above mentioned, in the form of alkali metal compounds of such elements, formed by reactions such as those set forth above. The undissolved residue, therefore, was substantially free from appreciable quantities of these elements, such residue containing substantially all the original antimony, bismuth, cadmium, copper, cobalt, nickel, zinc, lead, iron and manganese in the form of oxides of these metals, and also containing free gold and silver.

The residue was then leached with an aqueous solution of acetic acid containing 30% $HC_2H_3O_2$, by heating for about 30 minutes at 180° F. with said solution. The resulting solution was separated by filtration and the residue was washed with hot water. The filtrate contained substantially all of the lead, zinc, bismuth, cadmium and copper of the original mixture, all in the form of normal acetates, and also contained a trace of iron as a normal acetate. The amount of acetic acid employed was slightly in excess of the amount necessary to form such normal acetates of the above metals, not including the iron which was only slightly soluble in the acetic acid solution. The major portion of the iron was present as $Fe_2O_3$, which is substantially insoluble in the aqueous acetic acid solution.

The residue from the acetic acid leach contained all the silver and gold as free metals, substantially all the cobalt, nickel, and antimony as oxides, and most of the iron and manganese as oxides. This residue was therefore of such nature that it could readily be treated, either by smelting or cyaniding, to recover the silver and gold, or could be treated by known chemical methods to dissolve out and recover one or more of the other metals present therein.

The following examples will serve to illustrate the advantages of the present invention, as applied to different types of ores.

1. An ore containing compounds of one or more of the metals lead, zinc, copper, or iron with acidic radicals, and also containing gold and/or silver, either free or combined. The presence of zinc in such an ore would make it difficult and costly to recover silver or gold by ordinary roasting and smelting methods, while the presence of copper or lead would make it impracticable to recover the gold or silver by the cyanide process. Ordinary chemical methods, either alone or in conjunction with roasting, are also not well adapted to the treatment of such an ore. For example, leaching with hydrochloric acid would dissolve the copper, zinc, and/or iron, and would form a difficultly soluble chloride of lead and an insoluble chloride of silver. The cost of acid required would be prohibitive, particularly in the case of ores containing relatively large amounts of iron, and it would be difficult to recover the silver separately from the lead. Also, it would be impractical to recover the copper, zinc, or lead, separately from one another, from the mixed chloride solution. Nitric acid would dissolve all the metals except the gold. In this case also, a prohibitive amount of acid would be required, and it would be impractical by any known methods to separate the silver, lead, zinc, and/or copper from the nitrate solution. Sulphuric acid would dissolve the iron, zinc and copper as sulphates, and would leave a residue containing lead sulphate, silver (either as the free metal or as a sulphate) and free gold. Here again the cost of acid would be excessive, and it would be difficult to separate either the silver or the gold from the lead.

By treatment in accordance with the present invention, the acidic radical or radicals present in combination with any of the above metals in the ore may be converted to water-soluble alkali metal salts, and may thus be substantially eliminated by leaching with water. The lead, zinc and/or copper, which are converted to oxides, may be completely dissolved in acetic acid, leaving a residue containing the silver and gold as free metals, substantially free from all the other metals above mentioned with the exception of iron, and also free from any acidic radicals or elements which would tend to interfere with the recovery of the gold or silver from such residue. Said residue therefore may be economically treated, as by the cyanide process, to recover the gold and silver. The lead, zinc and copper in solution as acetates, may be readily separated from one another. The iron oxide remains as $Fe_2O_3$ in the residue. It does not interfere with the cyaniding for recovery of silver and gold, and economy is effected due to the fact that the reagent (acetic acid) used for dissolving the lead, zinc and copper does not dissolve the iron, or at least will dissolve only a relatively small proportion thereof. The absence of iron in the acetate solution also simplifies the recovery of lead, zinc, and/or copper from such solution.

2. An ore containing sulphur and/or arsenic, either combined with one another as $As_2S_3$, or combined with one or more metals in the form of sulphides, sulphates, arsenides, or arsenates, and also containing gold and/or silver. It would not be economically practicable to treat such an ore by leaching with acid, and it would be extremely difficult to separate the dissolved products from the mixed solutions obtained. Ordinary roasting methods would be extremely costly and time-consuming, and would also result in the evolution of objectionable fumes containing oxides of sulphur and/or arsenic, as well as loss of metals by volatilization. In certain cases, such as with ores containing lead sulphate or arsenate, ordinary roasting would be practically ineffective. Furthermore, it would be practically impossible by such methods to completely remove the sulphur and/or arsenic, and the presence of residual sulphates and/or arsenates would seriously interfere with the recovery of the silver and/or gold by either smelting or cyaniding.

However, by the method herein described, the sulphur and/or arsenic may be substantially completely removed as water-soluble alkali metal sulphates and/or arsenates. The silver and/or gold will be present in free state following the heating operation, while the other metals originally combined with the sulphur and/or arsenic will be converted to water-insoluble oxides, with the exception of mercury, which will be distilled off during such heating operation. Any metal oxides, such as oxides of lead, zinc, and/or copper, which would interfere with the subsequent recovery of the gold and/or silver, may be completely removed by leaching with an acetic acid solution, leaving a residue which may be treated without difficulty to recover the gold and/or silver, as by smelting or cyaniding.

3. An ore containing lead, zinc, copper, cadmium, and antimony, combined with one or more acidic radicals such as sulphide, sulphate, arsenide or arsenate. Separation of these various metals from such an ore would not be economically practical by other known methods. According to the present invention, the sulphur and/or arsenic may be removed as in Example 2 above, and the oxides of lead, zinc, copper, and cadmium, formed by heating with sodium carbonate or the like, may be completely dissolved by leaching with acetic acid. The resulting solution may readily be treated to separately recover one or more of these metals. Fig. 3 illustrates a procedure which may be employed, for example, to separate lead, zinc, copper, and cadmium from such a solution containing normal acetates of these metals. As shown at $C_1$, the lead may be substantially completely precipitated as lead sulphate from the mixed acetate solution containing excess acetic acid, by adding a suitable proportion of sulphuric acid, which will also regenerate an equivalent amount of acetic acid, and the precipitated lead sulphate may be filtered off as indicated at $C_2$. This procedure and other alternative means of precipitating the lead, as well as methods of subsequently converting the precipitated lead compound to other useful compounds, are more fully described in my above-mentioned application Serial No. 28,384. If a large amount of copper is present, the solution may be heated to distill off a suitable proportion of water and acetic acid as indicated at $C_3$ (the acetic acid being preferably recovered by condensation) and the still acid solution may then be cooled as at $C_4$ to cause crystallization of a large percentage of the copper as coper acetate. After separation of the crystallized copper acetate, the cadium and the remaining copper (or all the copper if none has been previously removed by crystallization as copper acetate) may be precipitated in elemental or metallic state by adding metallic zinc in divided condition as shown at $C_5$. The precipitated metals may be removed and the cadmium may be separated from the copper by dissolving with hot dilute hydrochloric acid solution as indicated at $C_6$. The solution remaining after precipitation of the copper and cadmium will contain substantially only zinc acetate, including that originally present and that formed by reaction of the added zinc with the cadmium and copper acetates, and some acetic acid. The zinc acetate may be recovered by heating to evaporate the water and acetic acid, or by precipitation with a suitable reagent, such as arsenic acid to precipitate zinc arsenate, resulting in re-generation of the acetic acid solution for re-use in the process. This latter procedure is illustrated at $C_7$.

The residue from the acetic acid leach will contain the antimony as oxide, which may be dissolved by leaching with an aqueous solution of a soluble tartrate, such as potassium acid tartrate to form potassium antimony tartrate in solution. After separating the resulting solution from any remaining gangue or other undissolved material, the antimony may be precipitated as the oxychloride, SbOCl or, by adding a large amount of water, such oxychloride may be hydrolized to form substantially insoluble oxide, $Sb_2O_3$.

In some cases, as in the case of ores containing higher sulphides of certain metals such as iron, it may be advantageous to first subject the ore to an ordinary oxidizing roast, to remove a portion of the sulphur or of some other element present, before roasting with an alkali metal carbonate or oxide, in order to reduce the amount of such alkali metal carbonate or oxide required to complete the conversion of the constituents to the desired products.

Also, it may in some cases be desirable to subject the undissolved residue following the water leaching step, and either before or after leaching with acetic acid or other solvent, to a second roasting operation with an alkali metal carbonate or oxide, to provide a more complete conversion of certain elements to the desired products, and to then again leach with water to dissolve additional amounts of water-soluble alkali metal compounds formed in the second roasting operation and, if desired, to also leach with acetic acid or other solvent to remove other products present in the mass following said second roasting operation.

The following specific examples will serve to illustrate the application of this invention to three different flotation concentrates containing gold and silver, together with other elements which would interfere with the economical recovery of such gold or silver by previously known methods. The purpose of the treatment in each case was to obtain a solid residue containing substantially all of the gold and silver in materially increased concentration, and substantially free from any element which would prevent satisfactory and economical recovery of the gold and silver by cyaniding or other known means, and also in some cases, to separately recover one or more other elements present in the original concentrate.

Concentrate No. 1

This concentrate consisted principally of sulphides of lead, zinc, iron, and arsenic, with small amounts of copper, antimony and bismuth, probably also present as sulphides. The concentrate contained a small amount of silicious gangue, and also contained some silver and gold. The chemical analysis of this concentrate was as follows:

| | |
|---|---|
| Pb _____ per cent__ | 53.65 |
| Zn _____ do____ | 3.60 |
| Fe _____ do____ | 11.60 |
| Cu _____ do____ | 0.20 |
| Sb _____ do____ | 0.49 |
| Bi _____ do____ | 0.011 |
| S _____ do____ | 20.50 |
| Si _____ do____ | 3.20 |
| Ca _____ do____ | 0.80 |
| As _____ do____ | 2.19 |
| Au _____ oz. per ton__ | 0.08 |
| Ag _____ do____ | 69.06 |

A 50 gram sample of the above material was roasted at approximately 650° C. in the presence of air, for twenty minutes. This preliminary roasting operation served to largely convert the FeS₂ to Fe₂O₃, and also to convert some of the PbS to PbSO₄. The sample was again weighed, and showed a loss of about four grams. The remaining 46 grams of material was mixed with 20 grams of Na₂CO₃ and roasted at approximately 700° C. in the presence of air, with continuous agitation, for about 30 minutes.

The roasted mixture was then leached with hot water, to remove the water-soluble alkali metal compounds, consisting principally of Na₂SO₄ and Na₃AsO₄. The remaining undissolved material was separated from the solution by filtration, and washed with water. The residue was then leached with a 30% solution of acetic acid containing approximately 20 grams HC₂H₃O₂ at about 160° F. for approximately 15 minutes, and was then filtered and washed. The filtrate contained 25.5 grams of lead, 1.3 grams of zinc, and a trace of iron and copper, as normal acetates, and also contained 3.0 grams of free acetic acid. 12.2 grams of 98% H₂SO₄ was added to this filtrate, and the mixture was filtered and the precipitate washed. The precipitate consisted substantially wholly of lead sulphate, and the filtrate from this operation contained only traces of lead, iron and copper, about 1.28 grams of zinc, and 17.4 grams of free acetic acid. The separated lead sulphate was then put in suspension with water, and to this was added a solution containing 8.47 grams Na₂CO₃, 3.08 grams NaOH, and 100 grams of water. The PbSO₄ was converted to substantially pure basic lead carbonate, 2PbCO₃·Pb(OH)₂, and this was separated by filtration and washed. After drying, this basic lead carbonate product weighed 31.2 grams. The filtrate from this operation contained substantially only Na₂SO₄.

The chemical analysis of the residue following the acetic acid leaching operation was as follows:

| | | |
|---|---|---|
| Pb | per cent | 7.00 |
| Zn | do | 1.40 |
| Cu | do | 0.02 |
| Fe | do | 46.00 |
| Sb | do | 1.62 |
| Bi | do | 0.034 |
| S | do | 0.50 |
| Si | do | 13.20 |
| Ca | do | 0.03 |
| As | do | 0.04 |
| Au | oz. per ton | 0.329 |
| Ag | do | 284 |

*Concentrate No. 2*

This concentrate consisted substantially wholly of sulphides of lead, zinc, and iron, with a small amount of antimony. It also contained a small amount of silicious gangue, and some silver and gold. The chemical analysis thereof was as follows:

| | | |
|---|---|---|
| Pb | per cent | 68.0 |
| Zn | do | 10.0 |
| Fe | do | 2.4 |
| Sb | do | 0.8 |
| S | do | 16.4 |
| Si | do | 2.6 |
| Au | oz. per ton | 0.063 |
| Ag | do | 36.4 |

A 100 gram sample of this material was mixed with 55 grams Na₂CO₃, and roasted. This roasting operation was conducted in the presence of air, at a temperature between 400° and 800° C., for about 30 minutes. The roasted mixture was then leached with water and washed. The undissolved residue was then leached with a 30% solution of acetic acid containing 62 grams HC₂H₃O₂, and was filtered and washed. The filtrate contained 66.0 grams of lead and 9.8 grams of zinc.

The chemical analysis of the undissolved residue following the acetic acid leach was as follows:

| | | |
|---|---|---|
| Pb | per cent | 8.00 |
| Zn | do | 1.00 |
| Fe | do | 30.10 |
| Sb | do | 8.70 |
| S | do | 1.00 |
| Si | do | 32.50 |
| Au | oz. per ton | 0.788 |
| Ag | do | 454 |

This residue was again roasted with additional sodium carbonate, and leached with water, and then with an acetic acid solution. The filtrate from this second acetic acid leach contained about 1.9 grams of lead of about 0.20 gram of zinc. The undissolved residue, following the second acetic acid leach, had the following chemical analysis:

| | | |
|---|---|---|
| Pb | per cent | 1.6 |
| Zn | do | 0.53 |
| Fe | do | 39.30 |
| Sb | do | 11.20 |
| S | do | trace |
| Si | do | 45.20 |
| Au | oz. per ton | 1.02 |
| Ag | do | 590 |

*Concentrate No. 3*

This concentrate consisted principally of sulphides of lead and zinc, and contained considerable gold and silver. It probably also contained some chloride or other halide. It may have also contained a small amount of oxide or sulphate. The chemical analysis was as follows, no analysis having been made for chloride or other halide.

| | | |
|---|---|---|
| Pb | percent | 67.00 |
| Zn | do | 15.50 |
| Ca | do | 0.60 |
| S | do | 12.10 |
| Si | do | 3.40 |
| Au | oz. per ton | 0.96 |
| Ag | do | 100. |

A 100 gram sample of this material was mixed with 62 grams Na₂CO₃, and roasted for 30 minutes at 700° C. in an oxidizing atmosphere, with continuous agitation. The roasted mixture was leached with water at 200° F., and was then filtered and washed. The undissolved residue was leached with a 30% acetic acid solution contaning 70 grams HC₂H₃O₂ at approximately 160° F. for 20 minutes, and was then filtered and washed. The filtrate contained 65 grams of lead and 14.3 grams of zinc. To this filtrate there was added 31 grams H₂SO₄, to precipitate the lead substantially wholly as lead sulphate. The precipitated lead sulphate was separated by filtration and washed. The filtrate from this operation contained only a small amount of lead, and also contained 14.2 grams of zinc and 41 grams of free acetic acid.

The residue from the acetic acid leach had the following chemical analysis:

| | | |
|---|---|---|
| Pb | percent | 10.00 |
| Zn | do | 5.20 |
| Si | do | 80.6 |
| Ca | do | trace |
| Au | oz. per ton | 14.88 |
| Ag | do | 1548. |

This residue was mixed again with Na₂CO₃ and roasted as before, then leached and washed with water, then leached with 30% acetic acid, and then washed. The remaining undissolved residue had the following chemical analysis:

| | | |
|---|---|---|
| Pb | percent | 1.94 |
| Zn | do | 0.19 |
| Silica and gangue | do | 86.8 |
| Au | oz. per ton | 29.30 |
| Ag | do | 3048.5 |

While I have herein described certain preferred embodiments of this invention by way of illustration, it will be understood that the various steps and features of the process may be varied by those skilled in the art without departing from the spirit of this invention or exceeding the scope of the appended claims.

I claim:

1. The method of treating an ore containing a metallic element and also containing a plurality of other elements each capable of forming a water-soluble alkali metal salt by reaction with an alkali metal compound selected from the group consisting of alkali metal carbonates and oxides, which comprises: heating such an ore in divided condition, at a temperature below the temperature of fusion, with an alkali metal compound selected from said group, in sufficient amount to react substantially completely with all of said other elements to cause formation of water-soluble alkali metal salts of all of said other elements, and to form a mass containing said salts and also containing said metallic element in a form substantially insoluble in water; leaching said mass with water to dissolve said alkali metal salts, and separating the resulting solution from the undissolved residue containing said metallic element; treating said solution to separate one of said other elements therefrom while leaving another of said other elements dissolved therein, and then treating the remaining solution to recover the last-mentioned other element therefrom.

2. A method of treating an ore containing a metallic element selected from the group consisting of lead, zinc, copper, and cadmium, and another metallic element selected from the group consisting of nickel, cobalt, iron, manganese, antimony, gold, silver, and platinum, and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a soluble alkali metal salt of the last-mentioned element and to form a mass containing said salt and also containing both of said metallic elements in forms substantially insoluble in water; leaching said mass with water to dissolve said soluble alkali metal salt and leave an undissolved residue containing an oxide of the first-mentioned metallic element and containing said other metallic element in a form substantially insoluble in an aqueous solution of an organic acid; separating the resulting solution from said undissolved residue; leaching said undissolved residue with an aqueous solution of an organic acid to dissolve said first-mentioned metallic element; separating the resulting solution from remaining undissolved material containing said other metallic element; and treating the solution thus separated to recover said first-mentioned element therefrom.

3. The method as set forth in claim 2, and also comprising the step of treating said remaining undissolved material to recover said other metallic element.

4. The method as set forth in claim 2, and also comprising the steps of treating said remaining undissolved material with another liquid solvent to dissolve said other metallic element; and separating the solution containing said other metallic element from remaining undissolved material.

5. A method of treating an ore containing a metallic element selected from the group consisting of lead, zinc, copper, and cadmium, and another metallic element selected from the group consisting of nickel, cobalt, iron, manganese, antimony, gold, silver, and platinum and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a soluble alkali metal salt of the last-mentioned element and to form a mass containing said salt and also containing both of said metallic elements in forms substantially insoluble in water; leaching said mass with water to dissolve said soluble alkali metal salt and leave an undissolved residue containing an oxide of the first-mentioned metallic element and containing said other metallic element in a form substantially insoluble in an aqueous solution of an organic acid; separating the resulting solution from said undissolved residue; leaching said undissolved residue with an aqueous solution of an organic acid to dissolve said first-mentioned metallic element; separating the resulting solution from remaining undissolved material containing said other metallic element; and subsequently treating said undissolved material to recover said other metallic element.

6. The method of treating an ore containing two metallic elements selected from the group consisting of lead, zinc, copper, and cadmium, and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of said other element and form a mass containing said salt and also containing both of said metallic elements in forms substantially insoluble in water; leaching said mass with water to dissolve said soluble alkali metal salt and leave an undissolved residue containing oxides of both of said metallic elements; separating the resulting solution from said undissolved residue; leaching said undissolved residue with an aqueous solution of an organic acid to dissolve both of said metallic elements and form a solution containing salts of said metallic elements with said organic acid; separating the resulting solution from remaining undissolved material; treating the last-named solution to separate one of said metallic elements therefrom while leaving the other of said elements dissolved therein; and then treating the remaining solution to recover said other metallic element therefrom.

7. The method of treating an ore containing lead and another metal selected from the group consisting of zinc, copper, cadmium, and bismuth, and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of the last-mentioned element and to form a mass containing said salt and also containing oxides of lead and said other metal; leaching said mass with water to dissolve said salt, and separating the resulting solution from the undissolved residue containing said oxides; leaching said residue with an aqueous solution of an organic acid to dissolve said oxides and form salts of lead and of said other metal with said acid in solution; separating the resulting solution from the remaining undissolved material; treating the last-named solution with a mineral acid to precipitate a lead salt of said mineral acid while leaving said other metal dissolved in said solution; and separating the precipitated lead salt from the solution.

8. The method of treating an ore containing sulphur and arsenic which comprises: heating such an ore in divided condition at a temperature below the temperature of fusion, with an alkali metal compound selected from the group consisting of alkali metal carbonates and oxides, in sufficient amount to react substantially completely with said sulphur and arsenic, to cause formation of alkali metal sulphate and alkali metal arsenate, and to form a mass containing said sulphate and arsenate and also containing material substantially insoluble in water; leaching said mass with water to dissolve said sulphate and arsenate, and separating the resulting solution from the undissolved residue; treating said solution with a soluble sulphate of a metal capable of forming a difficultly soluble arsenate, to cause precipitation of said difficultly soluble arsenate of said metal and form additional alkali metal sulphate in solution; and separating the precipitated arsenate of said metal from the resulting solution containing alkali metal sulphate formed by said heating operation and also by said treatment with soluble metal sulphate solution.

9. The method of treating an ore containing lead and zinc and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of said other element and to form a mass containing said salt and also containing substantially water-insoluble oxides of lead and zinc; leaching said mass with water to dissolve said salt, and separating the resulting solution from the undissolved residue containing said lead and zinc oxides; leaching said residue with an aqueous solution of an organic acid to dissolve said lead and zinc oxides and form salts of lead and zinc with said acid in solution; separating the resulting solution from remaining undissolved material; treating the last-named solution with a mineral acid to precipitate a lead salt of said mineral acid while leaving the zinc dissolved in said solution; and separating the precipitated lead salt from the solution.

10. The method of treating an ore containing lead and copper and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of said other element and to form a mass containing said salt and also containing substantially water-insoluble oxides of lead and copper; leaching said mass with water to dissolve said salt, and separating the resulting solution from the undissolved residue containing said lead and copper oxides; leaching said residue with an aqueous solution of an organic acid to dissolve said lead and copper oxides and form salts of lead and copper with said acid in solution; separating the resulting solution from remaining undissolved material; treating the last-named solution with a mineral acid to precipitate a lead salt of said mineral acid while leaving the copper dissolved in said solution; and separating the precipitated lead salt from the solution.

11. The method of treating an ore containing copper and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of said other element and to form a mass containing said salt and also containing substantially water-insoluble copper oxide; leaching said mass with water to dissolve said salt, and separating the resulting solution from the undissolved residue containing copper oxide; leaching said undissolved residue with an aqueous solution of an organic acid capable of forming a water-soluble copper salt, to dissolve said copper oxide and form a salt of copper with said acid in solution; separating the resulting solution from remaining undissolved material; and treating the last-named solution to recover copper therefrom.

12. The method of treating an ore containing zinc and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of said other element and to form a mass containing said salt and also containing substantially water-insoluble zinc oxide; leaching said mass with water to dissolve said salt, and separating the resulting solution from the undissolved residue containing zinc oxide; leaching said undissolved residue with an aqueous solution of an organic acid capable of forming a water-soluble zinc salt, to dissolve said zinc oxide and form a salt of zinc with said acid in solution; separating the resulting solution from remaining undissolved material; and treating the last-named solution to recover zinc therefrom.

13. The method of treating an ore containing copper and zinc and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, at a temperature below the temperature of fusion, to cause formation of a water-soluble alkali metal salt of said other element and to form a mass containing said salt and also containing substantially water-insoluble oxides of copper and zinc; leaching said mass with water to dissolve said salt, and separating the resulting solution from the undissolved residue containing said copper and zinc oxides; leaching said undissolved residue with an aqueous solution of an organic acid capable of forming water-soluble salts of copper and zinc, to dissolve said copper and zinc oxides and form salts of copper and zinc with said acid in solution; separating the resulting solution from remaining undissolved material; and treating the last-named solution to separate the copper from the zinc.

14. The method as set forth in claim 13, in which said last-named solution is cooled to cause crystallization therefrom of the salt of copper with said acid, while leaving the zinc salt substantially dissolved; and the crystallized copper salt is separated from the remaining solution.

15. The method as set forth in claim 13, in which said last-named solution is treated with metallic zinc to cause precipitation of metallic copper therefrom and form additional zinc salt of said acid in solution; and the precipitated copper is separated from the solution.

16. A method of treating an ore containing a metallic element selected from the group consisting of lead, zinc, copper, and cadmium, and another metallic element selected from the group consisting of nickel, cobalt, iron, manganese, antimony, gold, silver, and platinum, and also containing sulphur, which comprises: heating such an ore in divided condition, at a temperature below the temperature of fusion, with an alkali metal compound selected from the group consisting of alkali metal carbonates and oxides, in sufficient amount to react substantially completely with said sulphur to produce a water-soluble alkali metal salt thereof, and form a mass containing said alkali metal salt and also containing said metallic elements in forms substantially insoluble in water; leaching said mass with water to dissolve said alkali metal salt and leave an undissolved residue containing an oxide of the first-mentioned metallic element and containing said other metallic element in a form substantially insoluble in an aqueous solution of an organic acid; separating the resulting solution from said undissolved residue; leaching said undissolved residue with an aqueous solution of an organic acid to dissolve said first-mentioned metallic element; separating the resulting solution from remaining undissolved material containing said other metallic element; and treating the solution thus separated to recover said first-mentioned element therefrom.

17. A method of treating an ore containing iron and a metallic element selected from the group consisting of lead, zinc, copper, and cadmium, and also containing another element capable of forming a water-soluble alkali metal salt by reaction with an alkali metal compound selected from the group consisting of alkali metal carbonates and oxides, which comprises: heating such an ore in divided condition with an alkali metal compound selected from said group, in an oxidizing atmosphere and at a temperature below the temperature of fusion, to cause formation of a soluble alkali metal salt of the last-mentioned element and to convert said iron principally to the form of ferric oxide, and to form a mass containing said salt and said ferric oxide and also containing said metallic element in a form substantially insoluble in water; leaching said mass with water to dissolve said soluble alkali metal salt and leave an undissolved residue containing ferric oxide and an oxide of said metallic element; separating the resulting solution from said undissolved residue; leaching said residue with an aqueous solution of an organic acid to dissolve said metallic element in the form of a salt of said metallic element with said organic acid while leaving said ferric oxide substantially undissolved; separating the resulting solution from remaining undissolved material containing said ferric oxide; and treating the solution thus separated to recover said metallic element therefrom.

ORRIN F. MARVIN.